United States Patent
Li

(10) Patent No.: US 10,553,915 B1
(45) Date of Patent: Feb. 4, 2020

(54) SYSTEMS AND METHODS FOR CONFIGURING PARAMETERS FOR CHARGING A BATTERY PACK

(71) Applicant: O2Micro, Inc., Santa Clara, CA (US)

(72) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 0 days.

(21) Appl. No.: 15/881,573

(22) Filed: Jan. 26, 2018

(30) Foreign Application Priority Data

Feb. 15, 2017 (GB) .................................. 1702472.0

(51) Int. Cl.
*H01M 10/44* (2006.01)
*H01M 10/46* (2006.01)
*H02J 7/00* (2006.01)

(52) U.S. Cl.
CPC ........... *H01M 10/44* (2013.01); *H02J 7/0077* (2013.01)

(58) Field of Classification Search
CPC ............. H02J 2007/0001; H02J 7/0003; H02J 7/0052; H02J 2007/0059
USPC ................. 320/106, 107, 114, 141
See application file for complete search history.

(56) References Cited

U.S. PATENT DOCUMENTS

| | | | |
|---|---|---|---|
| 5,696,433 A | 12/1997 | Patino | |
| 5,713,939 A * | 2/1998 | Nedungadi | ........ A61N 1/37211 607/29 |
| 6,459,239 B1 | 10/2002 | Price et al. | |
| 2004/0113591 A1 | 6/2004 | Bradley et al. | |
| 2005/0134231 A1 | 6/2005 | Cho et al. | |
| 2008/0157714 A1 | 7/2008 | Lemay et al. | |
| 2008/0224662 A1 | 9/2008 | Hayakawa | |
| 2010/0214707 A1* | 8/2010 | Yun | ....................... H02J 7/0031 361/92 |
| 2010/0253285 A1 | 10/2010 | Takahashi et al. | |
| 2011/0140533 A1 | 6/2011 | Zeng et al. | |
| 2015/0102779 A1 | 4/2015 | Schumacher et al. | |

FOREIGN PATENT DOCUMENTS

JP 09259934 A 10/1997

\* cited by examiner

*Primary Examiner* — Edward Tso

(57) ABSTRACT

A charging system includes a charger operable for providing a charging current to a battery pack. The charger includes a charging switch coupled between a power source and the battery pack, and a controller operable for controlling the charging switch. The controller includes a voltage sensing pin coupled to the battery pack. The controller is operable for measuring a battery voltage of the battery pack via the voltage sensing pin during a plurality of discrete time slots, and is operable for adjusting a length of a time interval between two consecutive time slots of the plurality of discrete time slots based on the battery voltage, and the controller is operable for determining an identity of the battery pack and configuring charging parameters according to the identity.

12 Claims, 4 Drawing Sheets

SYSTEMS AND METHODS FOR CONFIGURING PARAMETERS FOR CHARGING A BATTERY PACK

RELATED APPLICATION

This application claims benefit under 35 U.S.C. § 119(a) to Application No. GB1702472.0, filed with the United Kingdom Intellectual Property Office on Feb. 15, 2017.

BACKGROUND

FIG. 1 shows a conventional charging system 100 which includes a charger 102 for charging a battery pack 104. The charger 102 includes an AC/DC (alternating current/direct current) converter 108 that converts an input AC power to an output DC power to charge the battery pack 104 under control of a charger controller 110. The battery pack 104 includes a primary protection circuit 118 that controls a first switch 114 and a secondary protection circuit 120 that controls a second switch 116. During the charging period, both switches 114 and 116 are on. When a cell voltage of the battery cell 122 reaches a first threshold $V_{CV}$, the primary protection circuit turns off the switch 114 to stop the charging. In case the primary protection circuit 118 fails to perform the desired protection, for example if the cell voltage keeps rising, the secondary protection circuit 120 can detect this condition and turn off the switch 116 when the cell voltage reaches a second threshold $V_{OV}$.

In some low cost applications or some applications with very limited printed circuit board (PCB) space such as electric toothbrushes, the protection switches 114 and 116 and corresponding protection circuits 118 and 120 not only increase the total cost, but also increase the space requirement. In order to reduce the cost and PCB space for these compact and low cost applications, a new solution is needed.

SUMMARY

Embodiments in accordance with the present invention provide systems and methods for charging a battery pack.

In an embodiment, a charging system includes a charger operable for providing a charging current to a battery pack. The charger includes a charging switch coupled between a power source and the battery pack, and a controller operable for controlling the charging switch. The controller includes a voltage sensing pin coupled to the battery pack. The controller is operable for measuring a battery voltage of the battery pack via the voltage sensing pin during a plurality of discrete time slots, and is operable for adjusting a length of a time interval between two consecutive time slots of the plurality of discrete time slots based on the battery voltage, and the controller is operable for determining an identity of the battery pack and configuring charging parameters according to the identity.

In another embodiment, a method for charging a battery pack includes: providing a charging current from a charger to the battery pack; detecting an identity of the battery pack; configuring charging parameters according to the identity; measuring a battery voltage of the battery pack during a plurality of discrete time slots; and adjusting a length of a time interval between two consecutive time slots of the plurality of discrete time slots based on the battery voltage.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
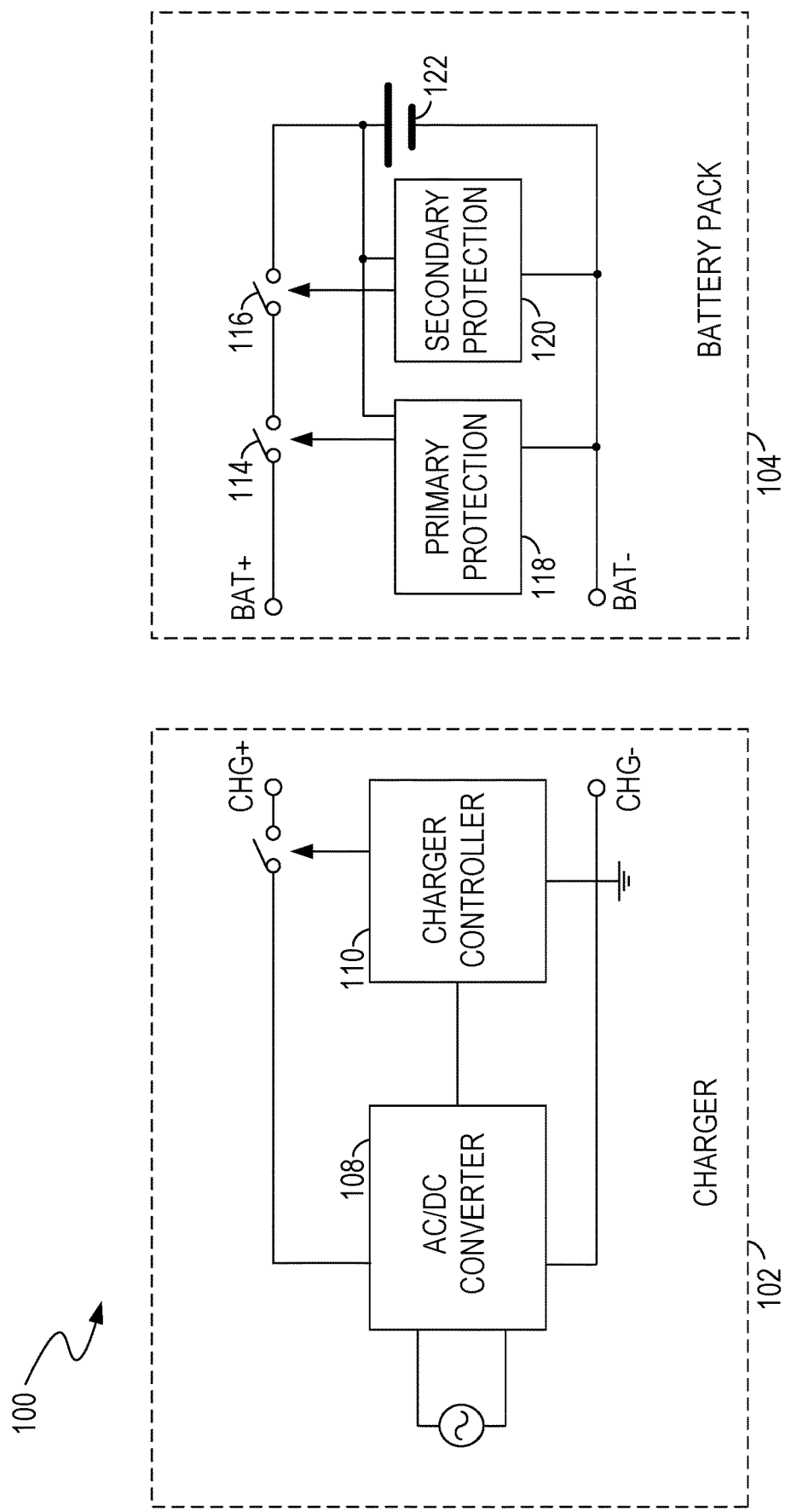
FIG. 1 shows a conventional charging system.
Figure 2:
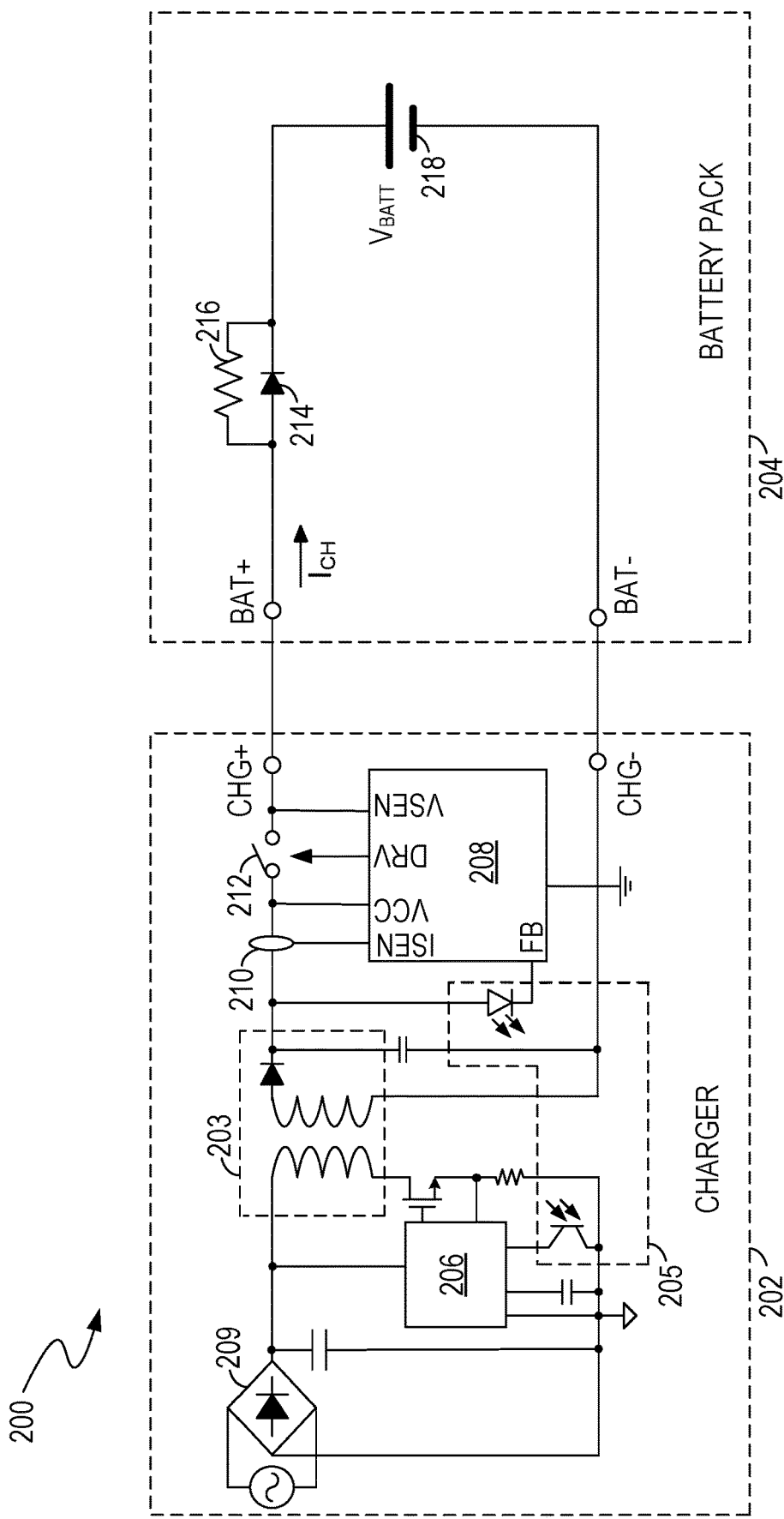
FIG. 2 shows a charging system, in accordance with an embodiment of the present invention.

FIG. 2 shows a charging system 200, in accordance with an embodiment of the present invention. The charging system 200 includes a charger 202 and a battery pack 204.

The charger 202 includes an AC/DC controller 206 that controls an AC/DC converter. In an embodiment, the AC/DC converter includes a rectifier 209 and a transformer 203. The AC/DC converter is operable for providing a charging current ICH at output terminal CHG+ to the battery pack 204. The charger 202 further includes a charging switch 212, a current sensor 210 and a charger controller 208. The charging switch 212 is coupled between the AC/DC converter and the output terminal CHG+. The current sensor 210 is coupled to the AC/DC converter for sensing the charging current level. In the example of FIG. 2, the charger controller 208 includes a current sensing pin ISEN, a power pin VCC, a driving pin DRV, a feedback pin FB and a voltage sensing pin VSEN. The current sensing pin ISEN is coupled to the current sensor 210 for monitoring the charging current. The power pin VCC receives power from the AC/DC converter to power the charger controller 208. The charger controller 208 can sense the output voltage of the AC/DC converter through the VCC pin and send a feedback signal to the AC/DC controller 206 via the optical coupler 205, such that the output voltage of the AC/DC converter can be regulated. For example, if the output voltage is below a target value, the charger controller 208 can regulate a current of the optical coupler 205 to send the feedback signal to the AC/DC controller 206. In response to the feedback signal, the AC/DC controller 206 increases the output voltage by increasing a duty cycle of a pulse width modulation (PWM) signal. The driving pin DRV is coupled to the charging switch 212 for providing a driving signal to control the charging switch 212. The feedback pin FB is coupled to the AC/DC controller 206 through the optical coupler 205. The voltage sensing pin VSEN is coupled to the battery pack 204 via the output terminal CHG+ of the charger 202, and can be utilized by the charger controller 208 to measure a battery voltage of the battery pack 204.

The battery pack 204 includes a battery cell 218 and a diode 214 coupled in series with the battery cell 218. In the example of FIG. 2, the diode 214 is coupled between an anode of the battery cell 218 and a positive terminal BAT+ of the battery pack 204 for preventing a short-circuit between the positive terminal BAT+ of the battery pack 204 and the negative terminal BAT− of the battery pack 204. A cathode of the diode 214 is coupled to the anode of the battery cell 218. An anode of the diode 214 is coupled to the positive terminal BAT+. A resistor 216 is coupled in parallel with the diode. Although FIG. 2 only shows one battery cell 218, the battery pack 204 may include multiple battery cells coupled with each other in parallel and/or in series.

Figure 3:
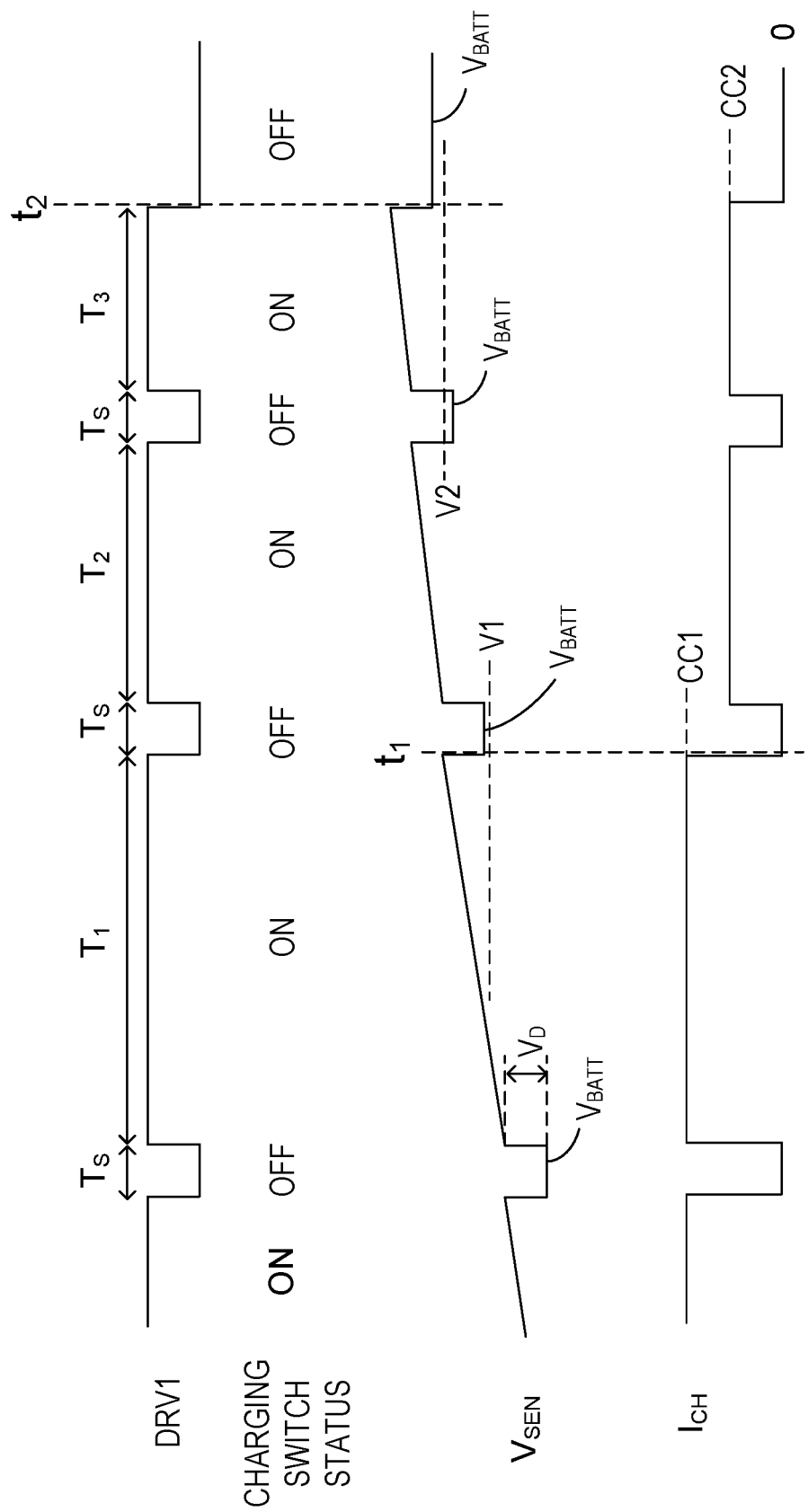
FIG. 3 shows waveforms associated with a charging system, in accordance with an embodiment of the present invention.

FIG. 3 shows waveforms associated with a charging system (e.g., the charging system in 200 of FIG. 2), in accordance with an embodiment of the present invention. FIG. 3 is described in combination with FIG. 2.

In operation, the charger 202 is operable for charging the battery pack 204 under control of the charger controller 208. The charging process can include a CC (constant current) charging stage and a CV (constant voltage) charging stage. For some applications with fewer battery cells and small charging current, the capacity of the battery pack can reach over 90% of full capacity and thus the CV charging stage can be omitted in order to simplify the design for both the charger and the battery pack. A proper CC charging strategy can extend the capacity even further to reduce the capacity loss caused by the absence of the CV charging stage, which will be described below.

Initially, the charging switch 212 can be off. When the battery pack 204 is connected, the charger controller 208 can detect the presence of the battery pack 204 through the voltage sensing pin VSEN, e.g., by detecting a battery voltage $V_{BATT}$ at the voltage sensing pin VSEN. According to the battery voltage $V_{BATT}$, the charger controller 208 can set a charging mode, e.g., a CC charging mode, and starts charging the battery pack 204 with a charging current having a first level CC1.

More specifically, the charger controller 208 generates a driving signal DRV1 having a first state at the driving pin DRV to turn on the charging switch 212. The AC/DC converter provides the charging current with the first level CC1 through the current sensor 210 and the charging switch 212 to the battery pack 204. During charging, a voltage VSEN which is measured at the voltage sensing pin VSEN increases with the battery voltage $V_{BATT}$ of the battery pack 204. Neglecting the effect of the resistor 216, the voltage $V_{SEN}$ is equal to the sum of the battery voltage $V_{BATT}$ and a voltage drop $V_D$ across the diode 214. In an embodiment, the charger controller 208 is operable for measuring the battery voltage $V_{BATT}$ during the period when the charging switch 212 is on by subtracting the voltage drop $V_D$ from the voltage $V_{SEN}$, if the voltage drop $V_D$ is regarded to be constant. However, the $V_D$ across the diode 214 can actually vary with temperature, and consequently the voltage $V_{SEN}$ may not precisely represent the battery voltage $V_{BATT}$. Therefore, in another embodiment, the charger controller 208 is operable for measuring a more accurate battery voltage $V_{BATT}$ by temporarily interrupting the charging. More specifically, the charger controller 208 periodically generates the driving signal DRV1 having a second state (an off signal) at the driving pin DRV to turn off the charging switch 212 during each of multiple discrete time slots Ts, and measures the battery voltage $V_{BATT}$ during each of those discrete time slots (a discrete time slot is separate from, and does not coincide or overlap with, another discrete time slot). In an embodiment, the charger controller 208 is operable for adjusting a length of a time interval between two adjacent or consecutive time slots based on the voltage $V_{SEN}$ or based on the battery voltage $V_{BATT}$ (that is, each time slot is separated from the next, following time slot by a time interval, and the length of that time interval can be adjusted). As illustrated in FIG. 3, as the voltage $V_{SEN}$ (or the battery voltage $V_{BATT}$) increases, the charger controller 208 decreases the length of the time intervals between two adjacent or consecutive time slots. In an embodiment, if $V_{SEN}$ increases by x percent, then the charger controller 208 decreases the length of the time interval by the same percentage or by a proportional percentage. For example, as the voltage $V_{SEN}$ increases, the charger controller 208 sets the time interval T3 to be shorter than the time interval T2, and sets the time interval T2 to be shorter than the time interval T1. Although the time intervals between the discrete time slots can be adjusted, the length of each discrete time slot can be relatively constant, or at least is controlled independent of the voltage $V_{SEN}$ and/or the battery voltage $V_{BATT}$.

Moreover, the charger controller 208 is operable for adjusting charging parameters/algorithms according to the battery voltage $V_{BATT}$. In an embodiment, the charger controller 208 is operable for decreasing the charging current if the battery voltage $V_{BATT}$ is greater than a first threshold (e.g., a CV threshold) V1. For example, at time $t_1$, the charger controller 208 turns off the charging switch 212 and detects that the battery voltage $V_{BATT}$ is greater than the first threshold V1. Accordingly, the charger controller 208 decreases the charging current from the first level CC1 to a level CC2, e.g., by controlling the AC/DC converter through the optical coupler 205. For example, the charger controller 208 can adjust a current reference from a level corresponding to CC1 to a level corresponding to CC2. The charger controller 208 can further utilize an amplifier to sense a difference between the charging current and the current reference associated with CC2 and regulate a current of the optical coupler 205 to send the feedback signal to the AC/DC controller 206. In response to the feedback signal, the AC/DC controller 206 can adjust its output power to make the charging current follow its target level CC2.

Thus, when the charging switch 212 is turned on again, the charging current is adjusted from CC1 to CC2. In another embodiment, instead of adjusting the charging current, the charger controller 208 is operable for switching the charging mode from a constant current (CC) charging mode to a constant voltage (CV) charging mode if the battery voltage $V_{BATT}$ is greater than a first threshold (e.g., a CV threshold) V1. In the CV charging mode, the charger 202 charges the battery pack 204 by a constant voltage (not shown in FIG. 3).

In an embodiment, the charger controller 208 is operable for cutting off the charging current if the battery voltage $V_{BATT}$ is greater than a second threshold (e.g., an 0V threshold) V2. For example, at time t2, if the charger controller 208 turns off the charging switch 212 and detects that the battery voltage $V_{BATT}$ is greater than the second threshold V2, then the charger controller 208 keeps the charging switch 212 off to complete charging. In another embodiment, at time t2, if the battery voltage $V_{BATT}$ is detected to be greater than the second threshold V2 and the charger controller also detects that the charging current has already decreased to the minimum level of multiple predefined levels, then the charger controller 208 keeps the charging switch 212 off to complete charging.

After the charging is completed, if the battery pack 204 is still connected with the charger 202, the charger 202 is operable for implementing a recharging function to maintain maximum battery capacity. In an embodiment, the charger controller 208 keeps checking the battery voltage $V_{BATT}$ while the charging switch 212 is off. If the battery voltage $V_{BATT}$ drops below a recharge threshold, the charger 202 can resume the charging until the battery voltage $V_{BATT}$ increases to above an end-of-charge level, e.g., the second threshold V2.

In an embodiment, the charger 202 is operable for determining an identity of the battery pack 204 and configuring charging parameters/algorithm according to the identity. More specifically, in an embodiment, a resistance RB of the resistor 216 in the battery pack 204 can represent the identity of the battery pack 204. The identity can indicate information about the battery pack 204 such as the manufacturer of the battery pack, battery cell type, battery cell number, etc. The charger 202 can measure the resistance of the resistor 216 through the voltage sensing pin $V_{SEN}$ to determine the identity of the battery pack 204, and accordingly sets charging parameters such as the charging current level, the first threshold V1, the second threshold V2, and the recharge threshold, or selects a charging algorithm that is appropriate for or optimized for the battery pack.

In operation, when the charger controller 208 detects the battery pack 204 is attached, the charger controller 208 keeps the charging switch 212 off and measures a first battery voltage $V_{BATT1}$ while the charging switch 212 is off. Then the charger controller 208 draws a preset current $I_{DR}$ through the voltage sensing pin $V_{SEN}$. For example, the charger controller 208 enables a current sink (not shown in FIG. 2), which is integrated in the charger controller 208 and coupled to the voltage sensing pin $V_{SEN}$, such that the battery cell 218 discharges to generate the current $I_{DR}$ flowing from the anode of the battery cell 218, through the resistor 216, the positive terminal BAT+ of the battery pack 204, and the voltage sensing pin $V_{SEN}$ into the charger controller 208. The charger controller 208 measures a second battery voltage $V_{BATT2}$ while the charging switch 212 is off and the current $I_{DR}$ is generated, and determines an identity of the battery pack 204 based on a difference between the first battery voltage $V_{BATT1}$ and the second battery voltage $V_{BATT2}$.

More specifically, the resistance RB of the resistor 216 can be calculated by $(V_{BATT1}-V_{BATT2})/I_{DR}$. In an embodiment, the charger controller 208 includes a storage unit (not shown in FIG. 2) that stores multiple resistance values and corresponding charging parameters. The storage unit can be, for example, non-volatile or other memory that stores a look-up table (LUT). After obtaining the resistance RB, the charger controller 208 compares the resistance RB with the stored resistance values and retrieves the corresponding charging parameters. As an example, if the resistance RB is best matched with a value of 100K ohms in the LUT, then the charger controller 208 sets the charging current level, the first threshold V1, the second threshold V2, and the recharge threshold to be 0.1C, 4.25V, 4.30V, and 4.2V, respectively (where C is the charging rate). As another example, if the resistance RB is best matched with a value of 200K ohms in the LUT, then the charger controller 208 sets the charging current level, the first threshold V1, the second threshold V2, and the recharge threshold to be 0.2C, 4.45V, 4.5V, and 4.35V, respectively.

Figure 4:
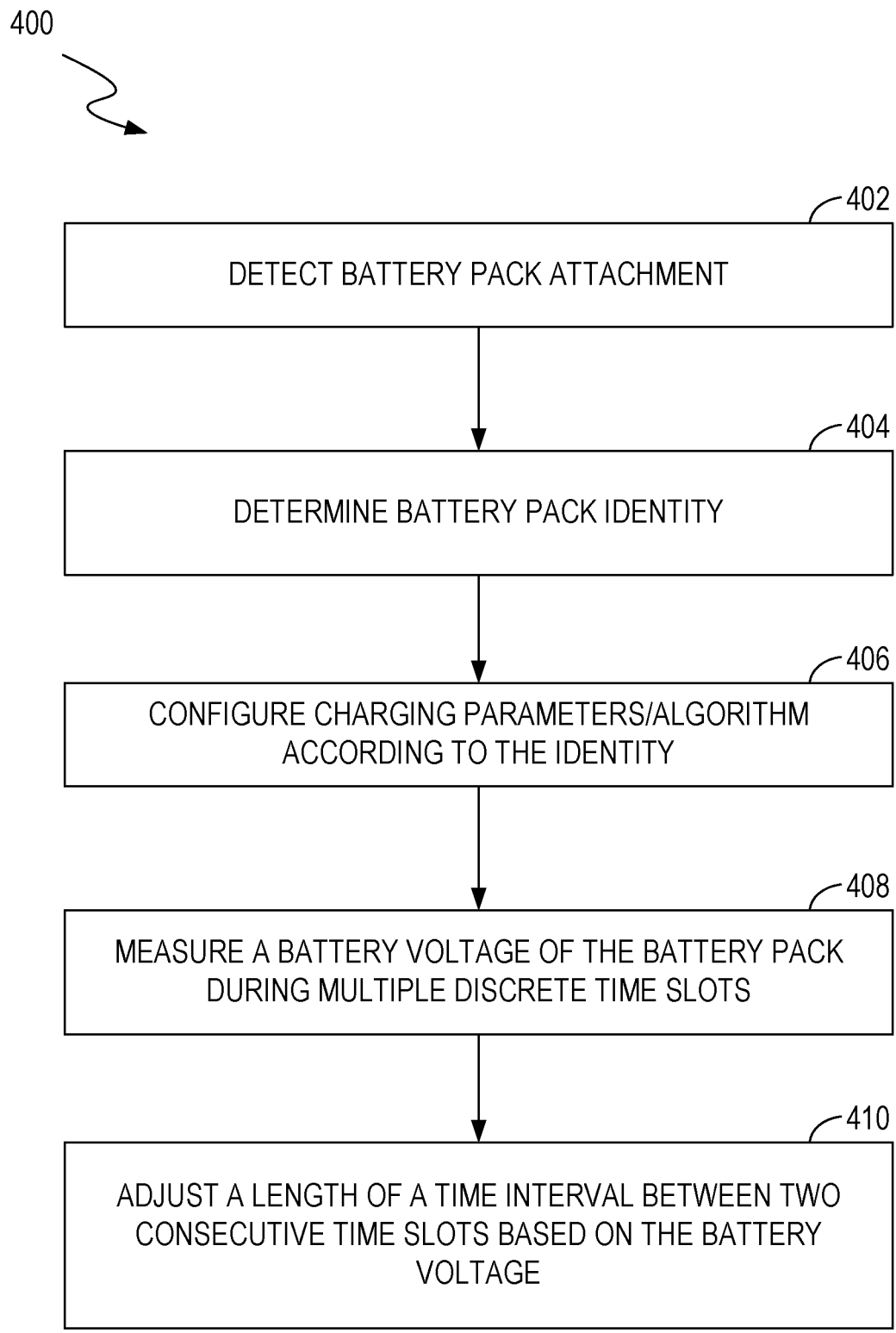
FIG. 4 shows a flowchart of a method for charging a battery pack, in accordance with an embodiment of the present invention.

FIG. 4 shows a flowchart 400 of a method for charging a battery pack, in accordance with an embodiment of the present invention. FIG. 4 is described in combination with FIG. 2.

In block 402, a charger 202 detects that a battery pack 204 is attached, e.g., through a voltage sensing pin.

In block 404, the charger 202 detects an identity of the battery pack 204, e.g., by measuring a resistance of a resistor in the battery pack 204.

In block 406, the charger 202 configures charging parameters and/or selects a charging algorithm according to the identity of the battery pack 204.

In block 408, the charger 202 measures a battery voltage of the battery pack 204 during multiple discrete time slots.

In block 410, the charger 202 adjusts a length of a time interval between two adjacent or consecutive time slots based on the battery voltage. In an embodiment, the charger 202 decreases the length of the time interval if the battery voltage increases.

Advantageously, embodiments according to present invention provide a low cost design for applications with limited PCB space such as compact power tools. The provided solution simplifies the battery pack design without sacrificing charging safety. Furthermore, by detecting an identity of the battery pack, an optimized charging profile can be used for the battery pack.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A charging system comprising:
   a charger operable for providing a charging current to a battery pack, wherein said charger comprises:
     a charging switch coupled between a power source and said battery pack; and
     a controller operable for controlling said charging switch and comprising a voltage sensing pin coupled to said battery pack,
   wherein said controller is operable for measuring a battery voltage of said battery pack via said voltage sensing pin during a plurality of discrete time slots, and is operable for adjusting a length of a time interval between two consecutive time slots of said plurality of discrete time slots based on said battery voltage, and
   wherein said controller is operable for determining an identity of said battery pack and configuring charging parameters for charging said battery pack according to said identity, wherein said charging parameters comprise a level of said charging current.

2. The charging system of claim 1, wherein said controller is operable for decreasing said length of said time interval if said battery voltage increases.

3. The charging system of claim 1, wherein said controller further comprises a driving pin coupled to said charging switch, wherein said controller is operable for turning on said charging switch to provide said charging current to said battery pack and for turning off said charging switch during said plurality of discrete time slots according to a state of a signal on said driving pin generated by said controller.

4. The charging system of claim 1, wherein said battery pack comprises a resistor coupled between an anode of a battery cell and a positive terminal of said battery pack,
  wherein said controller is operable for turning off said charging switch and measuring a first battery voltage of said battery pack while said charging switch is off,
  wherein said controller is operable for enabling said battery pack to generate a discharging current flowing from said anode of said battery cell through said resistor and said voltage sensing pin into said controller,
  wherein said controller is operable for measuring a second battery voltage of said battery pack while said discharging current is generated and said charging switch is off, and
  wherein said controller is further operable for determining said identity of said battery pack based on a difference between said first battery voltage and said second battery voltage.

5. The charging system of claim 1, wherein said battery pack comprises:
  a resistor coupled between a battery cell and a positive terminal of said battery pack; and
  a diode coupled in parallel with said resistor, wherein a cathode of said diode is coupled to an anode of said battery cell and an anode of said diode is coupled to said positive terminal of said battery pack, and
  wherein said controller is operable for measuring a resistance of said resistor through said voltage sensing pin, and determining said identity of said battery pack according to said resistance of said resistor.

6. The charging system of claim 5, wherein said controller further comprises a driving pin coupled to said charging switch, wherein said controller is operable for turning off said charging switch by driving an off signal at the driving pin and is operable for measuring a first battery voltage of said battery pack when said charging switch is off,
  wherein said controller is operable for enabling said battery pack to generate a discharging current flowing from said anode of said battery cell through said resistor and said voltage sensing pin into said controller,
  wherein said controller is operable for measuring a second battery voltage of said battery pack while said discharging current is generated and said charging switch is off,
  wherein said controller is further operable for measuring said resistance of said resistor based on a difference between said first battery voltage and said second battery voltage.

7. The charging system of claim 5, wherein said controller is operable for turning on said charging switch to provide said charging current to said battery pack and turning off said charging switch during said plurality of discrete time slots.

8. A method for charging a battery pack, comprising:
  providing, by a charger, a charging current to said battery pack;
  detecting an identity of said battery pack;
  configuring charging parameters for charging said battery pack according to said identity, wherein said charging parameters comprise a level of said charging current;
  measuring, by said charger, a battery voltage of said battery pack during a plurality of discrete time slots; and
  adjusting, by said charger, a length of a time interval between two consecutive time slots of said plurality of discrete time slots based on said battery voltage.

9. The method of claim 8, wherein said adjusting comprises:
  decreasing said length of said time interval if said battery voltage increases.

10. The method of claim 8, further comprising:
  turning on a charging switch in said charger to provide said charging current to said battery pack; and
  turning off said charging switch during said plurality of discrete time slots.

11. The method of claim 8, wherein said detecting an identity of said battery pack comprises:
  turning off a charging switch in said charger;
  measuring a first battery voltage of said battery pack while said charging switch is off;
  enabling said battery pack to generate a discharging current flowing from an anode of a battery cell in said battery pack through a resistor to said charger;
  measuring a second battery voltage of said battery pack while said discharging current is generated and said charging switch is off; and
  determining said identity of said battery pack based on a difference between said first battery voltage and said second battery voltage.

12. The method of claim 8, further comprising:
  measuring, by said charger, a resistance of a resistor in said battery pack; and
  determining, by said charger, said identity of said battery pack based on said measured resistance.

* * * * *